United States Patent [19]

De Beer

[11] Patent Number: 4,471,617
[45] Date of Patent: Sep. 18, 1984

[54] SOLAR POWERED ENGINE

[75] Inventor: Arnold A. De Beer, Kempton Park, South Africa

[73] Assignee: Grinaker Equipment Company, (Pty) Ltd., Transvaal, South Africa

[21] Appl. No.: 439,781

[22] Filed: Nov. 8, 1982

[30] Foreign Application Priority Data

Nov. 16, 1981 [ZA] South Africa ............ 81/7915

[51] Int. Cl.³ .................................. F03G 7/02
[52] U.S. Cl. .................... 60/641.11; 60/641.8; 60/671
[58] Field of Search ........... 60/530, 531, 641.8, 60/641.11, 651, 671, 675; 417/379

[56] References Cited

U.S. PATENT DOCUMENTS

| 3,790,305 | 2/1974 | Ledner | 60/531 X |
| 4,110,986 | 9/1978 | Tacchi | 60/641.8 |
| 4,180,982 | 1/1980 | Siegel | 60/531 |

Primary Examiner—Stephen F. Husar
Attorney, Agent, or Firm—Handal & Morofsky

[57] ABSTRACT

A solar powered engine 10, e.g. for pumping water, comprises a solar collector 116 in which a low boiling point liquid is vaporized, an engine comprising a piston 84 reciprocably movable in a chamber 82 where the resulting vaporized liquid does work, a condenser 126 where the vaporized liquid is condensed back into a liquid, means for returning the condensed liquid to the solar collector 116 and a transmission 88 which connects the piston 84 to a load. When the vaporized liquid is being introduced below the piston 84 to move the piston 84 to perform useful work, the condenser 126 is at the same pressure as a reservoir 142 so that condensed liquid may flow from the condenser 126 to the reservoir 142, and when the vaporized liquid is exhausting from below the piston 84 to permit the piston 84 to descend again, the reservoir 142 is at the same pressure as the solar collector 116 so that the condensed liquid may flow from the reservoir 142 to the solar collector 116 to complete the cycle.

15 Claims, 6 Drawing Figures

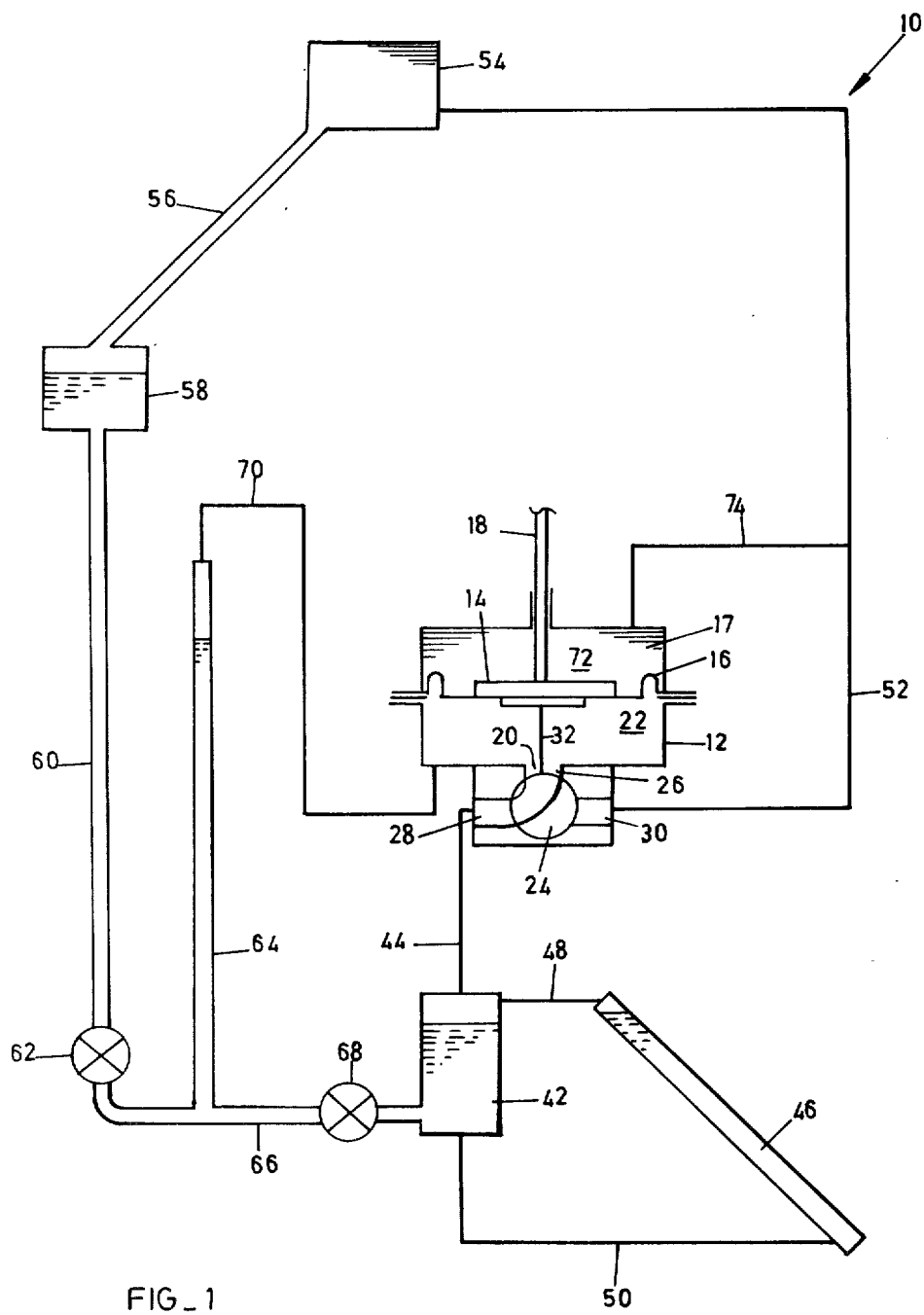
FIG_1

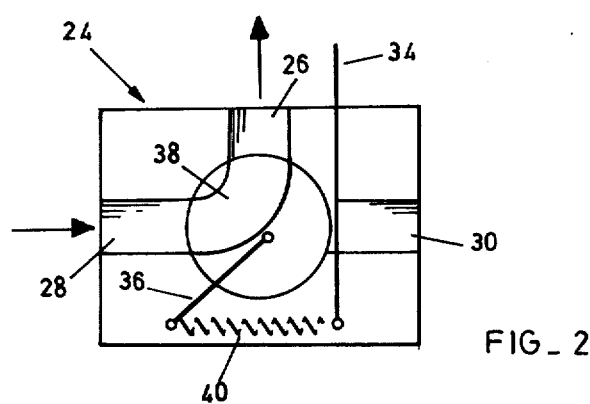
FIG_2
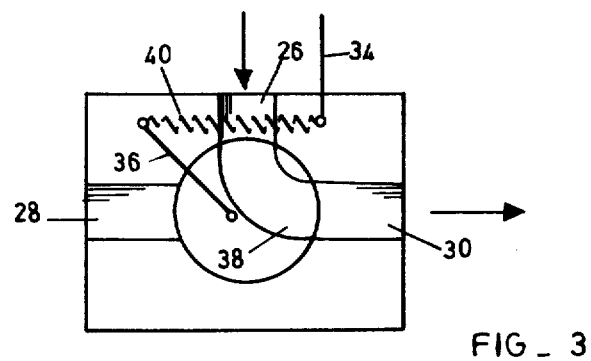
FIG_3

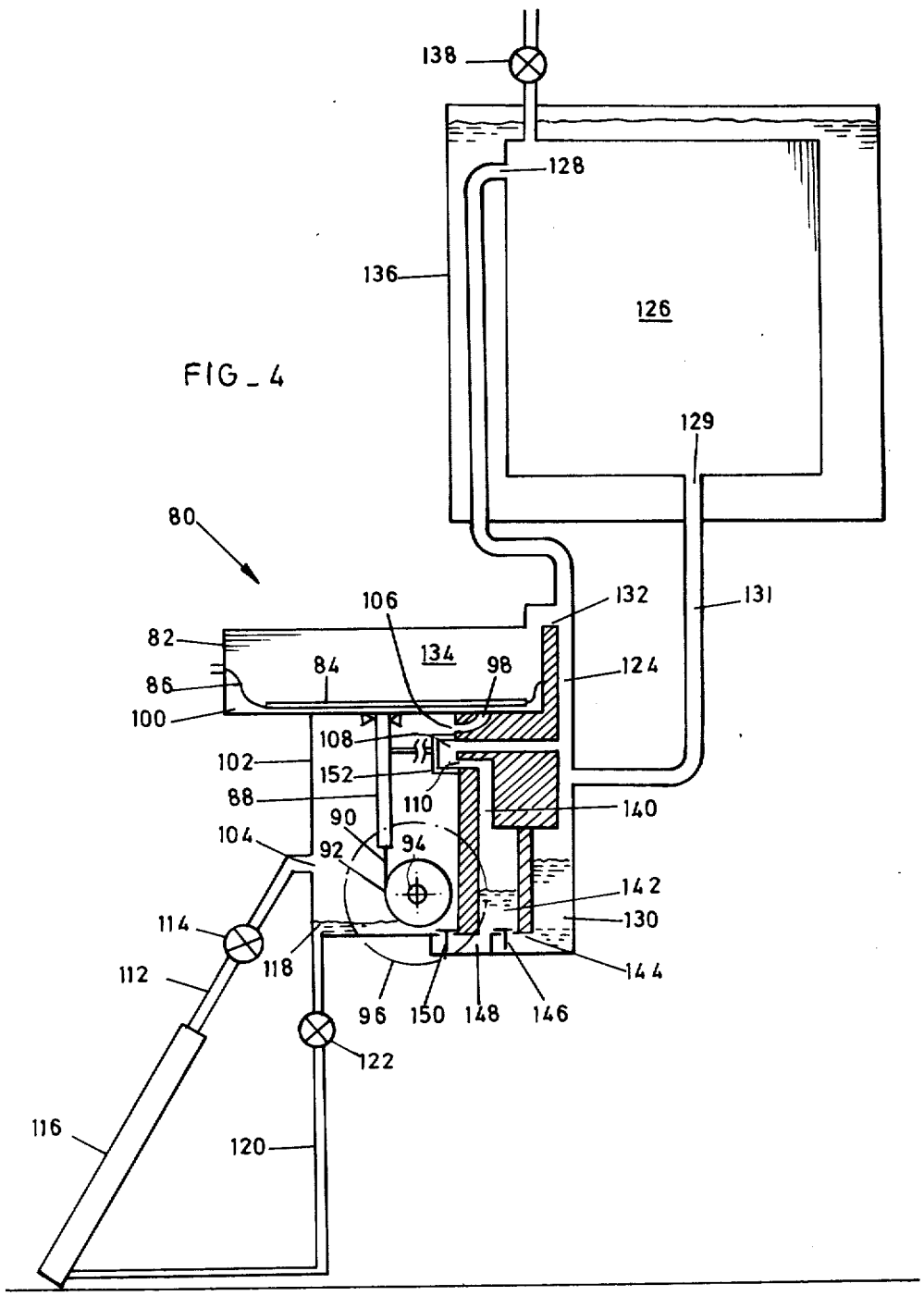

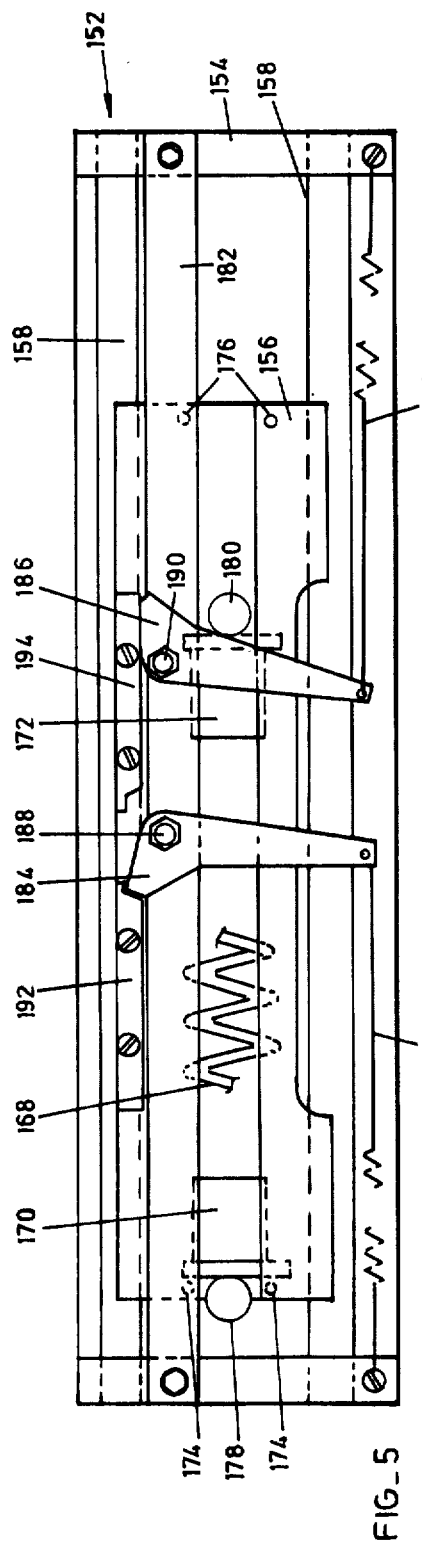
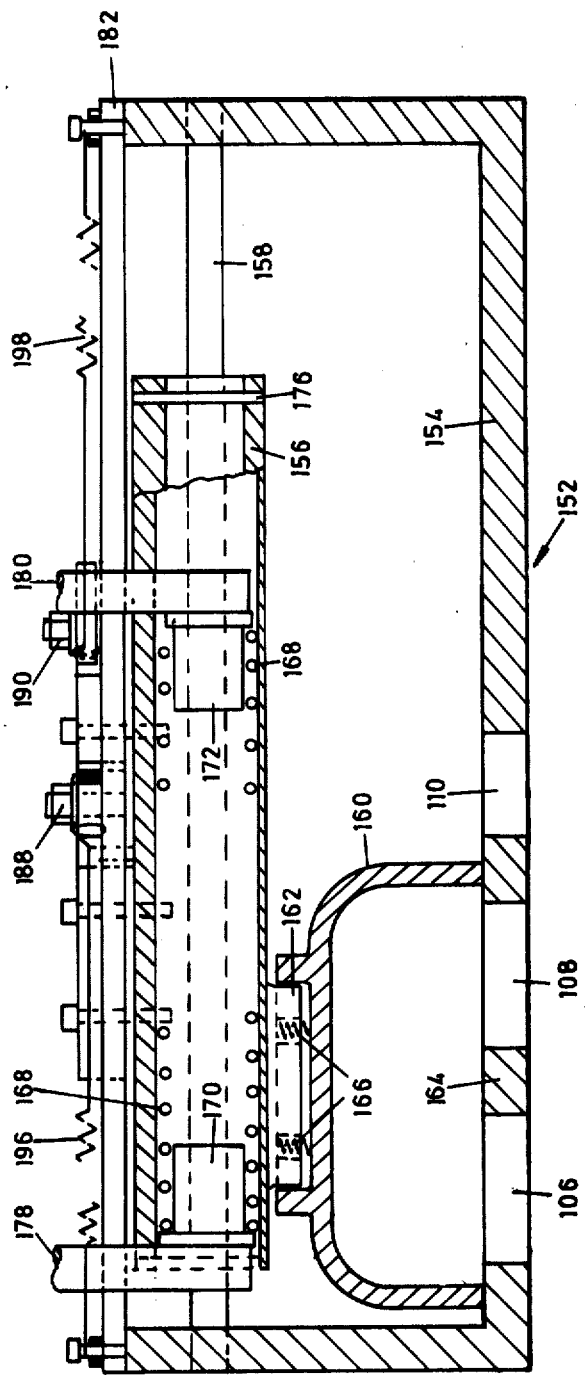
FIG_5
FIG_6

SOLAR POWERED ENGINE

BACKGROUND OF THE INVENTION

This invention relates to an engine in which solar power is used as the source of energy to produce a power output from the engine.

SUMMARY OF THE INVENTION

In an engine constructed in accordance with the instant invention, there is provided a chamber, a piston, a solar collector, a condensor, a liquid resevoir and a valve arrangement. The piston is reciprocably movable in the chamber between first and second positions. Liquid is vaporized by solar energy in the solar collector and introduced through an inlet into the chamber below the piston when the piston is in its first position. The piston is thus caused to move to its second position, performing useful work in the process. When in its second position, after useful work has been done by the vapor, the vapor is allowed to flow into the condensor, and ultimately, back into the liquid reservoir. The liquid, or working fluid, is then re-introduced to the solar collector and thus re-cycled. The reservoir is preferably located between the condensor and solar collector, the level of the liquid in the reservoir being higher than or at the same level as the liquid in the solar collector and lower than or at the same level as the liquid in the liquid end of the condenser. The compression cycle is controlled by the valve arrangement which alternately allows flow between the various parts of the system. In particular, the valve arrangement provides for alternately bringing into communication with the inlet: the solar collector; the vapor end of the condensor; and the chamber above the piston. The valve arrangement also allows for equalizing the pressure in the reservoir and the condensor or alternatively, the pressure in the reservoir and solar collector.

In a first embodiment of the invention, when the valve arrangement is in its first position, the pressures in the reservoir and in the solar collector are allowed to equalise and when the valve means is in its second position, the pressures in the reservoir and in the condenser are allowed to equalise.

In this case, the valve arrangement preferably comprises a three-port two-position valve, the first port communicating with the solar collector, the second port communicating with the inlet and the third port communicating with the vapour end of the condenser, and a vapour passage between the chamber below the piston and the reservoir above the liquid level therein, the valve being movable between a first position in which the first port is in communication with the second port so that the pressures in the solar collector, the chamber below the piston and the reservoir are substantially the same, with the condenser being isolated, and a second position in which the second port is in communication with the third port so that the pressures in the chamber below the piston, the condenser and the reservoir are substantially the same, with the solar collector being isolated.

The three-port two-position valve is preferably operated by movement of the piston in the chamber so that when the piston reaches its second position the valve is moved to its second position and when the piston reaches its first position the valve is moved to its first position.

In a second embodiment of the invention, when the valve arrangement is in its first position, the pressures in the reservoir and in the condenser are allowed to equalise and when the valve means is in its second position, the pressures in the reservoir and in the solar collector are allowed to equalise.

In this case the valve arrangement preferably comprises a four-port two-position valve, the first port communicating with the solar collector, the second port communicating with the inlet, the third port communicating with the vapour end of the condenser and the fourth port communicating with the reservoir, the valve being movable between a first position in which the first port is in communication with the second port and the third port is in communication with the fourth port, and a second position in which the first port is in communication with the fourth port and the second port is in commuhication with the third port.

The four-port two-position valve is preferably operated by movement of the piston in the chamber so that when the piston reaches its second position, the valve is moved to its second position and when the piston reaches its first position, the valve is moved to its first position.

The four-port two-position valve preferably comprises a chamber having an inlet corresponding to the first port, and three outlets corresponding to the second, third and fourth ports, a cup-shaped sliding member which is movable between a first position in which it brings the third port and the fourth port into communication and seals them off from the first port and the second port which are in communication, and a second position in which it brings the second port and the third port into communication and seals them off from the first port and the fourth port which are in communication, and a linkage connecting the sliding member to the piston and adapted to move the sliding member to its first position when the piston reaches its first position and to move the sliding member to its second position when the piston reaches its second position.

The linkage may comprise a pin attached to the piston, a compression spring located between two stops on the sliding member, the pin moving with movement of the piston through its cycle to compress the spring, first latching means adapted to hold the sliding member in its first position until the piston reaches its second position and then to release the sliding member allowing it to move to its second position under the influence of the compression spring, and second latching means adapted to hold the sliding member in its second position until the piston reaches its first position and then to release the sliding member allowing it to move to its second position under the influence of the compression spring.

In both embodiments of the invention the reservoir preferably communicates with the liquid end of the condenser by means of a passage including a non-return valve which is adapted to open to permit liquid to flow from the liquid end of the condenser to the reservoir when the vapour pressures in the condenser and the reservoir are substantially equal and to close when the vapour pressure in the reservoir is greater than the vapour pressure in the condenser, and the reservoir preferably also communicates with the solar collector by means of a passage including a non-return valve which is adapted to open to permit liquid to flow from the reservoir to the solar collector when the vapour pressures in the reservoir and the solar collector are substantially equal and to close when the vapour pressure in the solar collector is greater than the vapour pressure in the reservoir.

The piston preferably includes a diaphragm for providing a seal between the piston and the interior wall of the chamber.

The engine preferably includes transmission means attached to the piston for transmitting the reciprocal movement of the piston to a load, which may be a reciprocating water pump.

The liquid which is caused to vapourise in the solar collector may be a low boiling point liquid such as trichlorotrifluoroethane or trichloromonofluoromethane or the like.

BRIEF DESCRIPTION OF THE DRAWINGS

FIG. 1 is a schematic view of a first solar powered engine according to the invention;

FIGS. 2 and 3 are schematic views of a valve mechanism for use in the engine of FIG. 1;

FIG. 4 is a schematic view of a second solar powered engine according to the invention; and FIGS. 5 and 6 are two schematic views of a valve mechanism for use in the engine of FIG. 4.

DESCRIPTION OF PREFERRED EMBODIMENTS

Referring to FIG. 1, a solar powered engine 10 has a chamber 12 in which is located a piston 14. A diaphragm 16 is attached to the piston 14 to provide a gas-tight seal between the piston 14 and the interior wall of the chamber 12. The piston 14 is connected to a rod 18 which provides the mechanical output from the engine 10. The rod 18 may be connected, for example, to a reciprocating water pump. An inlet 20 opens into the space 22 in the chamber 12 below the piston 14.

Located below the chamber 12 is a three-port two-position valve 24, having three ports 26, 28 and 30. The valve 24 is operably linked via a linkage 32 to the piston 14. The valve 24 and the linkage 32 are illustrated in more detail in FIGS. 2 and 3. The linkage 32 comprises a first rod 34 which is connected to the piston 14, a second rod 36 which is connected to a valve spindle 38 and a spring 40 connecting the two rods 34 and 36. The valve spindle 38 alternately provides communication between the ports 26 and 28 (FIG. 2) and the ports 26 and 30 (FIG. 3). When the piston is in a low position in the chamber 12 (i.e. the first position of the piston), the port 26 is in communication with the port 28.

When the piston 14 begins to rise in the chamber 12, the rod 34 moves upwards until at the top of the stroke of the piston 14 (i.e. the second position of the piston) the rod 34 and the spring 40 cause the rod 36 to flip over which in turn causes the valve spindle 38 to rotate until the port 26 communicates with the port 30. When the piston 14 returns to its low position, the operation reverses itself so that the port 26 again communicates with the port 28. It is to be noted that the valve 24 only moves from one position to the other when the piston 14 reaches either the bottom (first position) or top (second position) of its movement in the chamber 12.

Referring again to FIG. 1, the port 28 of the valve 24 is connected to a fluid storage tank 42 via a feed line 44. The storage tank 42 is in turn connected to a solar connector 46 via feed lines 48 and 50.

The port 30 of the valve 24 is connected via a feed line 52 to the vapour end 54 of condenser 56 which can be air or water cooled.

The port 26 of the valve 24 communicates with the space 22 in the chamber 12 below the piston 14.

The condensor 56 also has a liquid end 58 which is connected via a feed line 60 and a non-return valve 62 to a reservoir 64. The reservoir 64 is also connected via a feed line 66 and a non-return valve 68 to the storage tank 42. A vapour passage or feed line 70 is connected between the reservoir 64 above the liquid level therein, and the chamber 12 below the piston 14. The feed line 52 is connected to the space 72 above the piston 14 by a feed line 74.

The operation of the engine 10 will now be described. As a result of the absorption of solar energy, the liquid contained in the solar collector 46, which may be any suitable liquid such as trichlorotrifluoroethane or preferably trichloromonofluoromethane heats up and vapourises. The vapour builds up a pressure in the solar collector 46 and flows via the feed line 48 into the storage tank 42. Prior to, and during the build-up of vapour pressure, the valve 24 is in the position shown in FIGS. 1 and 2, i.e. the port 28 which is connected to the storage tank 42, is in communication with the port 26, which opens into the space 22. The vapourised liquid thus flows from the storage tank 42 through the ports 28 and 26 into the space 22. This causes an increase of pressure in the space 22 relative to the pressure in the space 72, thereby causing the piston 14 to move upwards in the chamber 12. The space 22 is also connected via the feed line 70 to the reservoir 64. Thus, as the pressure in the space 22 builds up, the pressure in the reservoir 64 also builds up. The net liquid head resulting from the difference in liquid levels of the reservoir 64 and the storage tank 42 causes the non-return valve 68 to open, permitting liquid to flow from the reservoir 64 into the storage tank 42. The liquid then flows from the storage tank 42 into the solar collector 46 via the feed line 50 to replenish the vapourised liquid which has flowed into the space 22. As the vapour pressure in the reservoir 64 is greater than the vapour pressure in the liquid end 58 of the condenser 56 the non-return valve 62 remains closed.

When the vapour pressure has caused the piston 14 to reach the top of its stroke, the linkage 32 to the valve 24 causes this valve to move so as to cut off the flow of vapour from the storage tank 42 to the space 22 (i.e. ports 26 and 28 are no longer in communication), and to connect the ports 26 and 30 so that the space 22 is in communication with the vapour end 54 of the condenser 56. The exhausted vapour now flows from the space 22 via the ports 26 and 30 into the feed line 52 and to the vapour end 54 of the condenser 56. The exhausted vapour also flows via the feed line 74 to the space 72 on the other side of the piston 14 thus equalising the pressures on either side of the piston 14. The exhausted vapour is condensed in the condenser 56 and flows to the liquid end of the condenser 58. The differential pressure head between the liquid end 58 of the condenser 56 and the reservoir 64, the reservoir 64 and the condenser 56 being at the same pressure because of the feed line 70, causes the non-return valve 62 to open, permitting condensed liquid to flow from the liquid end 58 of the condenser 56 into the reservoir 64. The higher vapour pressure in the storage tank 42 than in the reservoir 64 ensures that the non-return valve 68 closes. Since the pressures on either side of the piston 14 are substantially equal, the piston 14 drops to its lower position under the influence of gravity. On reaching the lower position, the valve 24 is once again moved by the linkage 32 so that ports 28 and 26 are again in communication. The cycle now recommences.

It is to be noted that the engine 10 is a closed system as the liquid which is vapourised in the solar collector 46 flows into the space 22, then out of the space 22 to the condenser 56 where it is condensed and from there to the reservoir 64 and then back to the solar collector 46.

Referring now to FIG. 4, a solar powered engine 80 has a chamber 82 in which is located a piston 84. A diaphragm 86 is attached to the piston 84 to provide a gas-tight seal between the piston 84 and the interior wall of the chamber 82. The piston 84 is connected to a piston rod 88 which in turn is connected to a chain 90 which passes over a sprocket 92. A shaft 94 is attached to the sprocket 92. Mounted on the shaft 94 is a driven pulley 96 which in turn drives, e.g. a reciprocating water pump (not shown). An inlet 98 opens into the space 100 in the chamber 82 below the piston 84.

Located on the bottom of the chamber 82 is a second chamber 102 having an inlet 104 and three outlets 106, 108 and 110. The inlet 104 is connected via a feed line 112 and a stop valve 114 to a solar collector 116. The second chamber also includes a liquid outlet 118 which is connected via a feed line 120 and a stop valve 122 to the solar collector 116.

The first outlet 106 conmunicates with the inlet 98 into the space 100 in the chamber 82 below the piston 84.

The second outlet 108 is connected via a feed line 124 to a condenser 126 having a vapour end 128 and a liquid end 129. The liquid end 129 of the condenser 126 is connected via a feed line 131 to a storage chamber 130. The feed line 124 also communicates via a feed line 132 with the space 134 in the chamber 82 above the piston 84.

The condenser 126 comprises a set of vertical sided closed containers immersed in approximately 2000 liters of water in a large tank 136. The closed containers may be flat sided envelopes or conventional circular drums. The condenser 126 utilises the heat pipe principle, since condensation takes place continuously on the water cooled inner skin of the condenser 126. As soon as the condensate forms, it drains away via feed line 131 to the storage chamber 130, drawing fresh vapourised liquid into the condenser 126 via the feed line 124. The latent heat of condensation rejected into the condenser skin is carried away by natural convection of the water in the tank 136, causing the water temperature to rise slowly and ultimately transfer the heat to the outside air through the walls of the tank 136. An evacuation manifold and valve 138 located at the highest point of the condenser 126 permits the evacuation of all trapped air from the system.

The third outlet 110 communicates via a feed line 140 with a reservoir 142.

The reservoir 142 is connected via a feed line 144 and a non-return valve 146 to the storage chamber 130 and also via a feed line 148 and a non-return valve 150 to the second chamber 102.

Located in the second chamber 102 is a valve 152 which will be described in more detail with reference to FIGS. 5 and 6.

The valve 152 comprises a frame 154 mounted in the second chamber 102 and having three openings therein corresponding to the three outlets 106, 108 and 110.

A carriage 156 is supported for movement on two rails 158 which are mounted in the frame 154. A cup-shaped sliding member 160 is coupled to the carriage 156 by a lug 162 and is lightly pre-loaded against the interior surface 164 of the frame 154 by springs 166. Encased in the carriage 156 is a compression spring 168 and two spring followers 170 and 172, and located at either end of the carriage 156 are two pairs of stops 174 and 176 respectively. Protruding into the carriage 156, on either end of the spring 168, are two driving pins 178 and 180 which are fixedly attached to the piston rod 88. Mounted on a support bar 182 which is attached to the frame 154, are two latches 184 and 186 which are mounted for rotation about pivot pins 188 and 190 respectively. The latches 184 and 186 act against two stops 192 and 194 respectively which are attached to the carriage 156. The latches 184 and 186 are preloaded into their locked position by means of latch springs 196 and 198 respectively.

The driving pins 178 and 180 move up and down in the carriage 156 on movement of the piston 84 and piston rod 88, and cause up and down movement of the carriage 156 and hence the sliding member 160, between a first position when the outlet 108 is brought into communication with the outlet 110, and a second position in which the outlet 106 is brought into communication with the outlet 108. The up and down directions are illustrated by arrows.

The exact operation of the valve 152 will now be described.

The valve 152 is shown in FIGS. 5 and 6 in its second position, with the sliding member 160 bringing the outlets 106 and 108 into communication. When the valve 152 is in this position, the latch 184 is locked against the stop 192 thus preventing the carriage 156 from moving down. As the piston 84, piston rod 88 and thus driving pins 178 and 180 move down, the driving pins 178 and 180 carry the spring 168 with them downwards, leaving the carriage 156 locked in its second position. After the piston has travelled a certain distance the spring follower 172 contacts the stops 176 preventing further movement of the spring follower 172. The driving pin 178 continues to move downwards compressing the spring 168 until the driving pin 178 reaches the latch 184, which it then rotates in a counter-clockwise direction causing it to unlatch from the stop 192. The carriage 156 and the sliding member 160 are then driven by the compressed spring 168 downward to the first position, thus bringing the outlets 108 and 110 into communication. The driving pin 180 picks up the spring follower 172 before the carriage 156 strikes the frame 154 minimising any carriage/frame impact shock. With the carriage 156 in its first position, the latch spring 198 rotates the latch 186 into its locked position against the stop 194, thus locking the carriage 156 in this position. The piston 84 now rises and the spring 168 and the spring followers 170 and 172 are carried upwards by the driving pins 178 and 180 until the spring follower 170 contacts the stops 174. The spring 168 is now compressed in the upward direction until the latch 186 is unlatched by the driving pin 180 and the carriage 156 and the sliding member 160 are driven upward by the compressed spring 168. This completes a full cycle of the valve 152.

The operation of the engine 80 will now be described.

At the start up of the engine 80, the piston 84 is in its first low position in the chamber 82, the valve 152 is in its first position with the inlet 104 in communication with the outlet 106, and the two outlets 108 and 110 in communication, and the stop valve 114 is open (all as shown in FIG. 4). Solar energy falling on the solar collector 116 causes the liquid therein, which may be e.g. trichlorotrifluoroethane or trichloromonofluoromethane, to vapourise. The vapourised liquid flows via the feed line 112 into the second chamber 102 and via the outlet 106 into the inlet 98 communicating with the space 100 below the piston 84. This causes an increase in pressure in the space 100 relative to the pressure in the space 134 above the piston 84 (which is at the same pressure as the condenser 126 and the reservoir 142) and thus the piston 84 begins to rise in the chamber 82 to perform useful work. As the condenser 126 and the reservoir 142 are at the same vapour pressure, the difference in liquid levels in the storage chamber 130 and the reservoir 142 causes the non-return valve 146 to open so that liquid flows from the storage chamber 130 via the feed line 144 into the reservoir 142. The higher vapour pressure in the second chamber 102 relative to the pressure in the reservoir 142 ensures that the non-return valve 150 remains closed. When the piston 84 reaches its second position at the top of the chamber 82, the valve 152 moves to its second position as previously described, thus bringing the outlets 108 and 106 into communication, with the inlet 104 now being in communication with the outlet 110. The vapourised liquid under the piston 84 flows out of the inlet 98 into the outlet 106 and thence to the vapour end 128 of the condenser 126, and to the space 134 above the piston 84.

The vapourised liquid is condensed in the condenser 126 and flows to the storage chamber 130 from the liquid end 129 of the condenser 126 via the feed line 131. As the pressures on both sides of the piston 84 are now substantially the same, the piston 84 descends in the chamber 82 under the influence of gravity, back to its first position. Simultaneously, the pressures in the solar collector 116 and second chamber 102 and the reservoir 142 are equalised. The difference in liquid levels in the second chamber 102 and the reservoir 142 causes the non-return valve 150 to open so that liquid flows from the reservoir 142 via the feed line 148 into the second chamber 102 and from there via the feed line 120 back to the solar collector 116. As the vapour pressure in the reservoir 142 is greater than the vapour pressure in the storage chamber 130 (which is at condenser pressure), the non-return valve 146 remains closed. When the piston 84 reaches its first position again, the valve 152 moves back to its first position and the cycle is repeated. If it is desired to stop the operation of the engine 80, the stop valve 114 is closed.

It can be seen that the engine 80 also forms a closed system with the liquid which is vapourised in the solar collector being condensed and then returned thereto.

I claim:

1. A solar powered engine comprising:
   a chamber,
   a piston reciprocably movable in the chamber between a first position and a second position,
   an inlet into the chamber below the piston,
   a solar collector in which a liquid is caused to vapourise by solar energy,
   a condenser for condensing the vapourised liquid and having a liquid end and a vapour end,
   a reservoir located between the condenser and the solar collector and in communication with the condenser and the solar collector so that in use, the level of the liquid in the reservoir is higher than or the same as the level of the liquid in the solar collector and lower than or the same as the level of the liquid in the liquid end of the condenser,
   and valve means for alternately bringing the inlet into communication with the solar collector and with the vapour end of the condenser and the chamber above the piston, and for allowing alternately the pressure in the reservoir and the pressure in the condenser, and the pressure in the reservoir and the pressure in the solar collector, to equalise,
   the valve means being movable between a first position, when the piston is in its first position, in which the inlet is in communication with the solar collector so that vapourised liquid is introduced from the solar collector into the chamber below the piston thereby causing an increase of pressure in the chamber below the piston relative to the pressure in the chamber above the piston which causes the piston to move from its first position to its second position to perform useful work, and a second position, when the piston is in its second position, in which the inlet is in communication with the vapour end of the condenser so that vapourised liquid flows from the chamber below the piston to the vapour end of the condenser and to the chamber above the piston, to allow the pressure on both sides of the piston to be equalised thereby permitting the piston to move from its second position to its first position to complete one cycle of the piston,
   in one position of the valve means, the pressures in the reservoir and in the solar collector being allowed to equalise so that liquid may flow from the reservoir into the solar collector, and in the other position of the valve means the pressures in the reservoir and the condenser being allowed to equalise so that liquid may flow from the liquid end of the condenser into the reservoir.

2. An engine according to claim 1 wherein when the valve means is in its first position, the pressures in the reservoir and in the solar collector are allowed to equalise and when the valve means is in its second position, the pressures in the reservoir and in the condenser are allowed to equalise.

3. An engine according to claim 1 wherein when the valve means is in its first position, the pressures in the reservoir and in the condenser are allowed to equalise and when the valve means is in its second position, the pressures in the reservoir and in the solar collector are allowed to equalise.

4. An engine according to claim 2 wherein the valve means comprises a three-port two-position valve, the first port communicating with the solar collector, the second port communicating with the inlet and the third port communicating with the vapour end of the condenser, and a vapour passage between the chamber below the piston and the reservoir above the liquid level therein, the valve being movable between a first position in which the first port is in communication with the second port so that the pressures in the solar collector, the chamber below the piston and the reservoir are substantially the same, with the condenser being isolated, and a second position in which the second port is in communication with the third port so that the pressures in the chamber below the piston, the condenser and the reservoir are substantially the same, with the solar collector being isolated.

5. An engine according to claim 4 wherein the valve is operated by movement of the piston in the chamber so that when the piston reaches its second position the valve is moved to its second position and when the piston reaches its first position the valve is moved to its first position.

6. An engine according to claim 3 wherein the valve means comprises a four-port two-position valve, the first port communicating with the solar collector, the second port communicating with the inlet, the third port communicating with the vapour end of the condenser and the fourth port communicating with the reservoir, the valve being movable between a first position in which the first port is in communication with the second port and the third port is in communication with the fourth port, and a second position in which the first port is in communication with the fourth port and the second port is in communication with the third port.

7. An engine according to claim 6 wherein the valve is operated by movement of the piston in the chamber so that when the piston reaches its second position, the valve is moved to its second position and when the piston reaches its first position, the valve is moved to its first position.

8. An engine according to claim 7 wherein the valve comprises a chamber having an inlet corresponding to the first port, and three outlets corresponding to the second, third and fourth ports, a cup-shaped sliding member which is movable between a first position in which it brings the third port and the fourth port into communication and seals them off from the first port and the second port which are in communication, and a second position in which it brings the second port and the third port into communication and seals them off from the first port and the fourth port which are in communication, and a linkage connecting the sliding member to the piston and adapted to move the sliding member to its first position when the piston reaches its first position and to move the sliding member to its second position when the piston reaches its second position.

9. An engine according to claim 8 wherein the linkage comprises a pin attached to the piston, a compression spring located between two stops on the sliding member, the pin moving with movement of the piston through its cycle to compress the spring, first latching means adapted to hold the sliding member in its first position until the piston reaches its second position and then to release the sliding member allowing it to move to its second position under the influence of the compression spring, and second latching means adapted to hold the sliding member in its second position until the piston reaches its first position and then to release the sliding member allowing it to move to its first position under the influence of the compression spring.

10. An engine according to claim 1 wherein the reservoir communicates with the liquid end of the condenser by means of a passage including a non-return valve which is adapted to open to permit liquid to flow from the liquid end of the condenser to the reservoir when the vapour pressures in the condenser and the reservoir are substantially equal and to close when the vapour pressure in the reservoir is greater than the vapour pressure in the condenser, and wherein the reservoir communicates with the solar collector by means of a passage including a non-return valve which is adapted to open to permit liquid to flow from the reservoir to the solar collector when the vapour pressures in the reservoir and the solar collector are substantially equal and to close when the vapour pressure in the solar collector is greater than the vapour pressure in the reservoir.

11. An engine according to claim 1 wherein the piston includes a diaphragm for providing a seal between the piston and the interior wall of the chamber.

12. An engine according to claim 1 wherein the engine includes transmission means attached to the piston for transmitting the reciprocal movement of the piston to a load.

13. An engine according to claim 12 wherein the transmission means is connected to a reciprocating water pump.

14. An engine according to claim 1 wherein the liquid which is caused to vapourise in the solar collector is trichloromonofluoromethane.

15. An engine according to claim 1 wherein the liquid which is caused to vapourise in the solar collector is trichlorotriflouroethane.

* * * * *